(12) United States Patent
Lipscomb et al.

(10) Patent No.: US 9,575,745 B1
(45) Date of Patent: *Feb. 21, 2017

(54) IMMEDIATELY LAUNCHING APPLICATIONS

(71) Applicant: Amazon Technologies, Inc., Seattle, WA (US)

(72) Inventors: James Andrew Trenton Lipscomb, Seattle, WA (US); Christopher L. McGilliard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,400

(22) Filed: Oct. 12, 2015

Related U.S. Application Data

(63) Continuation of application No. 13/569,635, filed on Aug. 8, 2012, now Pat. No. 9,158,577.

(51) Int. Cl.
| | | |
|---|---|---|
| *G06F 15/173* | (2006.01) | |
| *G06F 9/445* | (2006.01) | |
| *H04L 29/08* | (2006.01) | |
| *G06F 9/50* | (2006.01) | |

(52) U.S. Cl.
CPC .............. *G06F 8/67* (2013.01); *G06F 9/5088* (2013.01); *H04L 67/34* (2013.01)

(58) Field of Classification Search
CPC .............. G06F 8/60; G06F 8/61; G06F 8/65; G06F 9/5083; G06F 11/1433
USPC ........ 709/226, 238; 717/100, 168, 170, 171, 717/174, 176
See application file for complete search history.

(56) References Cited

U.S. PATENT DOCUMENTS

| | | | |
|---|---|---|---|
| 2004/0060044 A1 | 3/2004 | Das et al. | |
| 2005/0210124 A1* | 9/2005 | Chua ................ | G06F 9/465 709/219 |
| 2005/0262494 A1* | 11/2005 | Fung ................. | G06F 8/67 717/170 |
| 2008/0301231 A1* | 12/2008 | Mehta ............... | G06F 8/61 709/204 |
| 2010/0058451 A1* | 3/2010 | Paramasivam ..... | G06F 9/5033 726/7 |
| 2011/0282995 A1* | 11/2011 | Gass ................. | G06F 8/65 709/226 |
| 2012/0144038 A1 | 6/2012 | Hildebrand | |

OTHER PUBLICATIONS

International Search Report in PCT/US13/54072 dated Feb. 21, 2014.

* cited by examiner

*Primary Examiner* — Frantz Jean
(74) *Attorney, Agent, or Firm* — Thomas | Horstemeyer, LLP

(57) ABSTRACT

Disclosed are various embodiments for a deployment management system. A second version of a deployable application is executed concurrently with a first version. Network traffic sent to the first version of the application is redirected to the second version. In the event of an error, network traffic is directed back to the first version of the application. After a period of concurrent execution, the first version of the application is terminated.

20 Claims, 4 Drawing Sheets

IMMEDIATELY LAUNCHING APPLICATIONS

CROSS-REFERENCE TO RELATED APPLICATIONS

This application is a continuation of and claims priority to U.S. application Ser. No. 13/569,635 titled "IMMEDIATELY LAUNCHING APPLICATIONS", filed Aug. 8, 2012, which is incorporated herein by reference in its entirety.

BACKGROUND

Developers are able to remotely deploy new versions of network-based applications. Bringing down an old version and deploying a new version can cause downtimes in client accessibility.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for a deployment management application. Developers wanting to deploy a new version of a network-based application must terminate the execution of the older version. This frees up system resources for the execution of the new version. When performed serially, there is downtime between when the older version has been terminated and when the new version has begun executing.

By allocating system resources for and beginning the execution of the new version of the application concurrent to the execution of the old version, customers can still access the older version of the application during the period in which the newer version is deploying. By redirecting network traffic destined for the older version to the newer version, customers are allowed to access the newer version with no downtime. In the event of an error in the newer version, the network traffic can be directed back to the still executing older version, minimizing any customer accessibility problems.

Once the newer version has successfully run concurrent with the older version for a satisfactory period of time indicating operational stability, the older version can be terminated and the resources dedicated to its execution freed, thereby eliminating long term net increases in resource usage for the concurrent execution.

In the following discussion, a general description of the system and its components is provided, followed by a discussion of the operation of the same.

Figure 1:
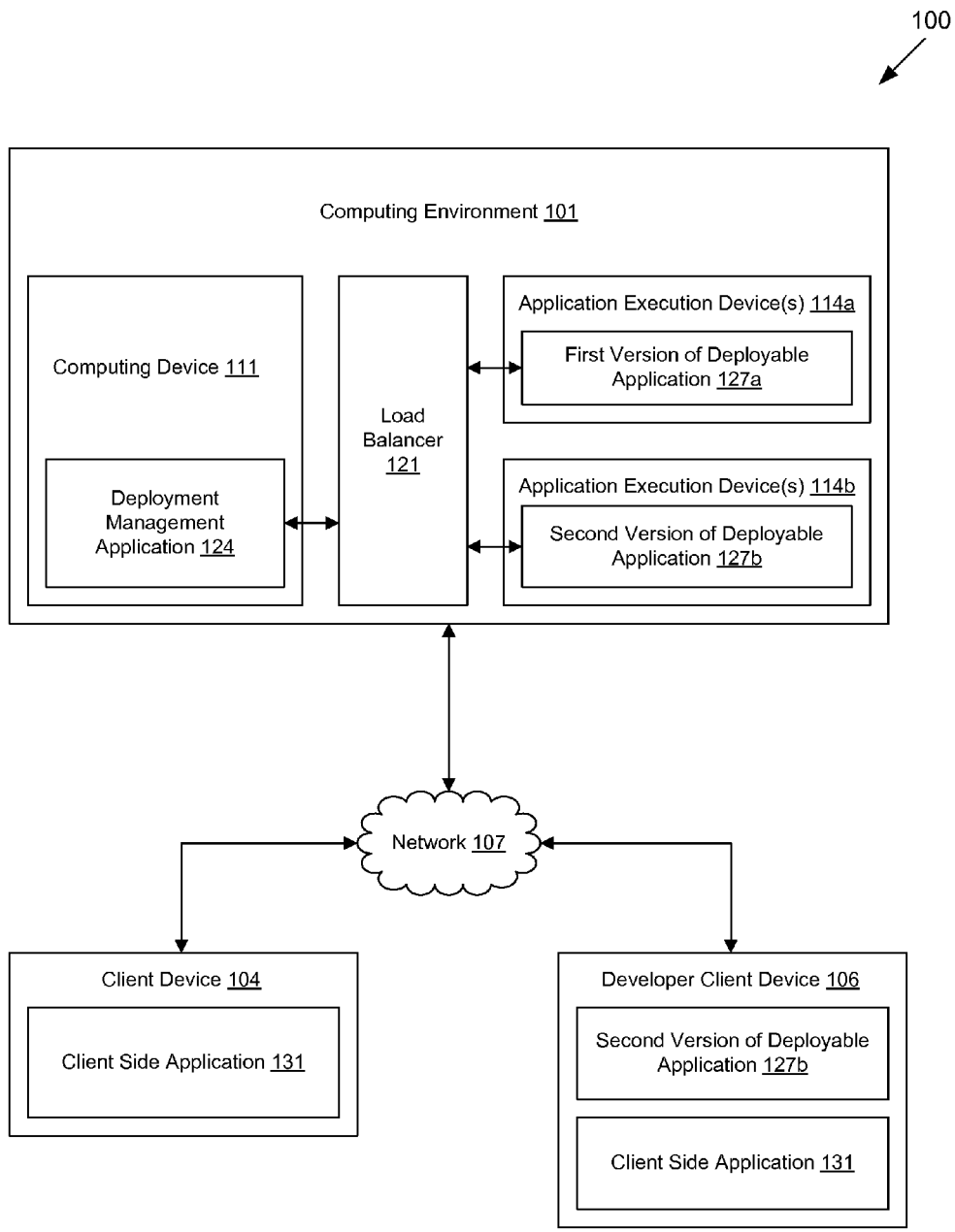
FIG. 1 is a drawing of a networked environment according to various embodiments of the present disclosure.

With reference to FIG. 1, shown is a networked environment 100 according to various embodiments. The networked environment 100 includes a computing environment 101, a client device 104, and a developer client device 106, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise one or more computing devices 111 and application execution devices 114a and 114b, referred to collectively as application execution device 114. A computing device 111 and application execution device 114 may comprise the same device, or separate devices. The computing device 111 and an application execution device 114 may each comprise, for example, a server computer or any other system providing computing capability. Alternatively, the computing device 111 and application execution device 114 may each employ a plurality of computing devices 111 or application execution devices 114 that may be arranged, for example, in one or more server banks or computer banks or other arrangements. Such computing devices 111 and application execution devices 114 may be located in a single installation or may be distributed among many different geographical locations. For example, the computing environment 101 may include a plurality of computing devices 111 and application execution devices 114 that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. The computing environment 101 may also comprise a load balancer 121, configured to manage the flow of data between the network 107 and the computing environment 101.

The components executed on the computing environment 101, for example, include a deployment management application 124, and other applications, services, processes, systems, engines, or functionality not discussed in detail herein. Also executed on the computing environment 101 are a first version of a deployable application 127a and a second version of a deployable application 127b, collectively referred to as deployable applications 127.

The deployment management application 124 is executed to facilitate the deployment and execution of deployable applications 127 on an application execution device 114. The deployable application 127 facilitates interactions with the computing environment 101 and a client device 104. The deployable application 127 may comprise a network page serving application or another network accessible application.

The first version of the deployable application 127a and the second version of the deployable application 127b are depicted as components of separate respective application execution devices 114a and 114b. The first version of the deployable application 127a and second version of the deployable application 127b may be executed on distinct application execution devices 114 or the same application execution device 114.

The client device 104 and developer client device 106 are representative of a plurality of client devices that may be coupled to the network 107 The client device 104 and developer client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client device 104 and developer client device 106 may be configured to execute various applications such as a client side application 131 and/or other applications. The client side application 131 may be executed in a client device 104 or developer client device 106, for example, to access network content served up by the computing environment 101 and/or other servers. To this end, the client side application 131 may, for example, correspond to a browser, a mobile application, etc. The client device 104 or developer client device 106 may be configured to execute applications beyond the client side application 131 such as, for example, mobile applications, email applications, social networking applications, and/or other applications. Developer client device 106 may also execute a deployable application 127 for testing or development of the deployable application 127, or for other purposes.

Next, a general description of the operation of the various components of the networked environment 100 is provided. To begin, a first version of a deployable application 127a is executed on an application execution device 114a. In some embodiments, multiple instances of the first version of the deployable application 127 may be executed. In other embodiments, a single instance is executed. The first version of the deployable application 127 may communicate with a client device 104 via a network 107.

A second version of the deployable application 127b is obtained by the deployment management application 124. In some embodiments, the second version of the deployable application 127b is communicated by a developer client device 106 to the computing environment 101 over the network 107. The second version of the deployable application 127b may be communicated by executing a client side application 131, or through other means. In another embodiment, the second version of the deployable application 127b is obtained from a version control system accessible by the computing environment 101. The second version of the deployable application 127b may be obtained in response to a commitment to the version control system by the developer client device 106, in response to an input from the developer client device 106 communicated to the deployment management application 124, or another event. Other techniques may also be used to obtain the second version of the deployable application 127b.

The deployment management application 124 then allocates computing resources of at least one application execution device 114b to facilitate the execution of the second version of the deployable application 127b. Computing resources may comprise disk space, memory, processor power, or other resources. Next, the deployment management application 124 initiates the execution of the second version of the deployable application 127b on the application execution device 114b. The second version of the deployable application 127b may be executed as a single instance or multiple instances. This results in the first and second versions of the deployable application 127 executing concurrently.

The deployment management application 124 may also comprise utility computing functionality, calculating a fee associated with the computing resources of application execution devices 114 which facilitate the execution of the first and second versions of the deployable application 127, or associated with other processes or components.

After the second version of the deployable application 127b has begun executing, communications sent by client devices 104 to the first version of the deployable application 127a are redirected to the second version of the deployable application 127b by the deployment management application 124. In some embodiments, this may comprise configuring a load balancer 121 to direct network 107 traffic to the second version of the deployable application 127b, thereby immediately redirecting the network traffic. In other embodiments, this comprises modifying a domain name system (DNS) entry associated with the first version of the deployable application 127a.

The deployment management application 124 may redirect the entirety of communications sent to the first version of the deployable application 127a, or a portion of the communications. For example, in embodiments in which multiple instances of the first version of the deployable application 127a are executed, the deployment management application 124 may redirect communications sent to a subset of instances of the first deployment application 127a, resulting in the communications sent to the other instances being unaffected.

The deployment management application 124 may also redirect an amount of network traffic sent to the first version of the deployable application 127a which increases over time. The amount of redirected network traffic may ramp up by increasing at predetermined intervals, be determined by some algorithm or function, be determined by input from a developer client device 106, or be derived from another source.

The deployment management application 124 may also redirect network traffic by communicating duplicate requests to the first version of the deployable application 127a and the second version of the deployable application 127b, but only communicate the responses sent by the second version of the deployable application 127b to the originator of the request. Performance may be evaluated based at least in part on how the second version of the deployable application 127b manages the load.

An event may trigger rollback functionality of the deployment management application 124 during the concurrent execution of the first and second versions of the deployable application 127. The event may comprise an error in the execution of the second version of the deployable application 127b. The event may also comprise receiving in the computing environment 101 an input communicated by a developer client device 106. The event may also comprise meeting another condition, or some other event.

When the rollback functionality is triggered, the deployment management application 124 directs any communications from client devices 104 sent to the second version of the deployable application 127b to the concurrently executing first version of the deployable application 127a. This may be accomplished by reconfiguring a load balancer 121, modifying a domain name system entry, or by another approach. After the communications have been redirected, the deployment management application 124 may terminate the execution of the second version of the deployable application 127b.

The deployment management application 124 may also free any computing resources of an application execution device 114b which were allocated to facilitate the execution of the second version of the deployable application 127b. Freeing of computing resources may comprise freeing or reallocating allocated memory, terminating services which facilitated the execution of the second version of the deployable application 127b, or another approach.

The deployment management application 124 may finalize the deployment of the second version of the deployable application 127b in response to a predefined condition. The predefined condition may comprise the time of concurrent execution of the first and second versions of the deployable application 127 exceeding a predefined threshold. The predefined condition may also comprise receiving an input from a developer client device 106 over the network 107. Other predefined conditions may also be employed.

If the deployment of the second version of the deployable application 127b is to be finalized, the deployment management application 124 may terminate the execution of the first version of the deployable application 127a. In embodiments in which multiple instances of the first version of the deployable application 127 are executed, a subset of these instances may be terminated. The entirety of the executed instances of the first version of the deployable application 127a may also be terminated.

After one or more instances of the first version of the deployable application 127a are terminated, the deployment management application 124 may free computing resources of an execution device 114a associated with the terminated instances. Freeing of computing resources may comprise freeing or reallocating memory allocated for the terminated instances of the first version of the deployable application 127a. Freeing of computing resources may also comprise terminating services which facilitated the execution of the terminated instances of the first version of the deployable application 127a, or another approach.

During any point in the deployment process of the second version of the deployable application 127b, the deployment management application 124 may communicate a notification to a developer client device 106 indicating the status of the deployment process. The notifications may be communicated at predefined time intervals, in response to a milestone being achieved, in response to an error, or at other times. The notification may be communicated by an email, a short messaging system (SMS) message, a network page, or by another approach.

Figure 2:
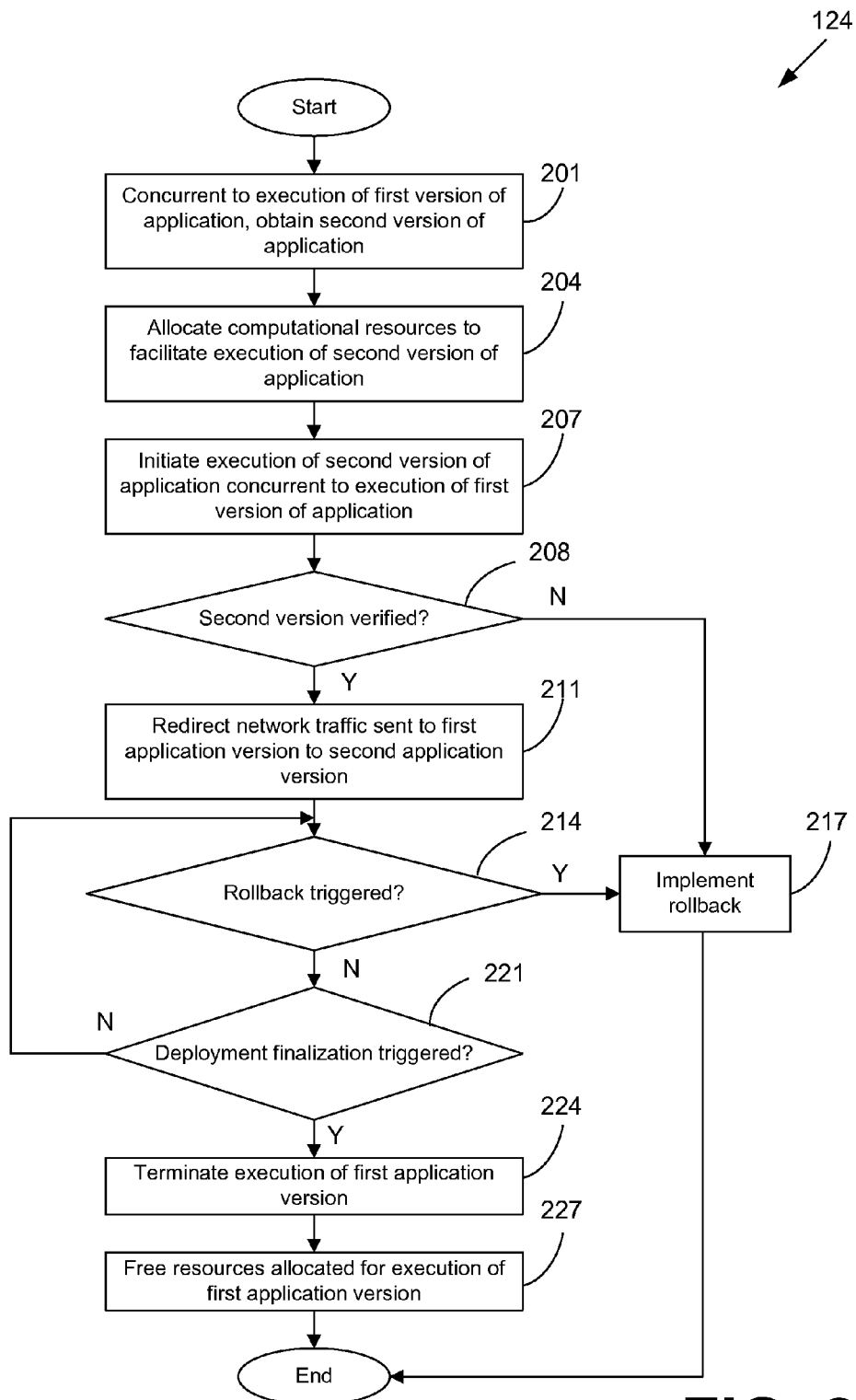
FIG. 2 is a flowchart illustrating one example of functionality implemented as portions of deployment management application executed in a computing environment in the networked environment of FIG. 1 according to various embodiments of the present disclosure.

Referring next to FIG. 2, shown is a flowchart that provides one example of the operation of a portion of the deployment management application 124 (FIG. 1) according to various embodiments. It is understood that the flowchart of FIG. 2 provides merely an example of the many different types of functional arrangements that may be employed to implement the operation of the portion of the deployment management application 124 as described herein. As an alternative, the flowchart of FIG. 2 may be viewed as depicting an example of steps of a method implemented in the computing environment 101 (FIG. 1) according to one or more embodiments.

Beginning with box 201, the deployment management application 124 obtains a second version of a deployable application 127b (FIG. 1) concurrent to the execution of a first version of the deployable application 127a. The execution of the first version of the deployable application 127a may comprise one or more instances executed on one or more application execution devices 114a (FIG. 1). The second version of the deployable application 127b may be obtained from a developer client device 106 (FIG. 1) over the network 107 (FIG. 1), from a version control system in response to a commitment to the version control system by a developer client device 106, or by another approach.

In box 204, computational resources of one or more application execution devices 114b (FIG. 1) are allocated to facilitate the execution of a second version of the deployable application 127b. The resources to be allocated may be determined by the deployment management application 124, another component of the computing environment 101 (FIG. 1), or another entity or device. Allocating computational resources may comprise allocating memory or disk space, initializing or terminating services or processes, alteration of a file system, allocation of network traffic or bandwidth, or other actions.

In box 207, after the requisite computational resources have been allocated, the deployment management application 124 initiates the execution of a second version of the deployable application 127b concurrent to the execution of the first version of the deployable application 127a. The execution of the second version of the deployable application 127b may comprise one or more instances executed on one or more application execution devices 114b.

In box 208, the deployment management application 124 may perform one or more verifications on the second version of the deployable application 127b. Verifications may comprise performing tests against the second version of the deployable application, performing data integrity operations against data associated with the second version of the deployable application 127b, or another approach. If the second version of the deployable application 127b is not verified, then a rollback is triggered in box 217. Otherwise, the operation proceeds.

Once one or more instances of the first and second versions of the deployable application 127 are executing concurrently and the second version of the deployable application 127b is verified, the deployment management application 124 redirects network traffic sent to the first version of the deployable application 127a to the second version of the deployable application 127b, as represented in box 211. This results in at least a portion of client devices 104 (FIG. 1) communicating with the second version of the deployable application 127b over network 107.

Redirecting network traffic may comprise reconfiguring a load balancer 121 (FIG. 1) of the computing environment 101 which manages incoming and outgoing data sent through the network 107. Redirecting network traffic may also comprise modifying a domain name system entry associated with the first version of the deployable application 127a. For example, if the first version of the deployable application 127a is executing on an application execution device 114a associated with a first internet protocol address and the second version of the deployable application 127b is executing on an application execution device 114b associated with a second internet protocol address, the deployment management application 124 may modify the domain name system entry to comprise the second internet protocol address. Other approaches may also be used to redirect network traffic sent over network 107.

In embodiments in which multiple instances of the first version of the deployable application 127a are executed, redirecting network traffic may comprise redirecting the network traffic sent to a subset of the executed instances of the first version of the deployable application 127a. Redirecting network traffic may also comprise redirecting network traffic sent to the entirety of executed instances of the first version of the deployable application 127a. Furthermore, redirecting network traffic may comprise redirecting an amount of network traffic which increases over time.

As shown in box 214, during the concurrent execution of the first and second versions of the deployable application 127, the deployment management application 124 monitors for events which would trigger rollback functionality of the deployment management application 124.

An event which triggers the rollback functionality may comprise an error in the execution of the second version of the deployable application 127b. Errors may comprise exceptions associated with code execution, data corruption, unwanted or unexpected functionality, speed or performance degradation, leaking memory allocated by the second version of the deployable application 127b, network congestion or capacity overload, or another error.

The deployment management application 124 may monitor for errors through event handlers, exception handlers, performance monitoring functionality, network traffic monitoring functionality, accessing a log associated with an application execution device 114b or the second version of the deployable application 127b, diagnostic utilities, submissions from client devices 104 or developer client devices 106 communicated by a reporting utility, or another approach.

In some embodiments, the deployment management application 124 initiates the rollback functionality in response to any detected error associated with the execution of the second version of the deployable application 127b. In other embodiments, the deployment management application 124 initiates the rollback functionality in response to an error falling within a predefined set of error classifications. The deployment management application 124 may also define an acceptable error threshold, and a rollback is triggered when an error exceeds that threshold. Other approaches may also be used to initiate rollback functionality in response to an error.

A rollback may also be triggered in response to satisfying a predefined condition relating to a statistical analysis of the performance of the second version of the deployable application 127b. The statistical analysis may comprise a measurement of allocated or used memory, a measurement of processing power, a measurement of network traffic, or another approach.

Events which trigger the rollback functionality may also comprise an input to terminate the execution of the second version of the deployable application 127b. The input to terminate the execution of the second version of the deployable application 127b may be communicated over a network 107 by a developer client device 106 associated with the deployable application 127. The input may be sent by a component of the computing environment 101 associated with a system administrator or other user with sufficient privileges. The input may also be sent from a service or process executed on an application execution device 114 or computing device 111 (FIG. 1). The input may also be sent from another source, component, service, function, or device. Should an event which triggers the rollback functionality occur, the deployment management application 124 initiates the rollback as shown in box 217, to be described later.

In box 221, the deployment management application 124 determines if an event has occurred which initiates the finalization of the deployment of the second version of the deployable application 127b. An event which triggers the finalization of the deployment may comprise the first and second versions of the deployable application 127 concurrently executing for a predetermined duration. In some embodiments, the duration is defined by the deployment management application 124 and applied to deployable applications 127. In other embodiments, the duration is defined in a user preference communicated by a developer client device 106. In further embodiments, a default duration may be defined by the deployment management application 124 and used in absence of the duration being defined by another source such as a user preference. Other approaches may also be used to define the duration.

Another event which triggers the finalization of the deployment may comprise receiving an input from a developer client device 106. Other events may also be employed to trigger deployment finalization. In the absence of an event which triggers the deployment finalization, the process returns to block 214. In response to an event which triggers the deployment finalization, the process proceeds to block 224.

In block 224, the deployment management application 124 terminates the execution of the first version of the deployable application 127a. In embodiments in which multiple instances of the first version of the deployable application 127a are executed concurrently, a subset of the executed instances may be terminated. In some embodiments, the entirety of executed instances may be terminated. Other approaches may also be used to terminate the execution of the first version of the deployable application 127a.

In block 227, resources allocated to facilitate the execution of the first version of the deployable application 127a are freed. In some embodiments, this comprises freeing the entirety of allocated resources associated with the first version of the deployable application. In other embodiments, this comprises freeing a subset of the allocated resources. Freeing the allocated resources associated with the execution of the first version of the deployable application 127a may comprise freeing allocated memory, modifying a file system associated with the disk space of an application execution device 114a, or terminating one or more services or processes. Freeing allocated resources may also comprise freeing all resources associated with the application execution device 114a, or another approach.

Figure 3:
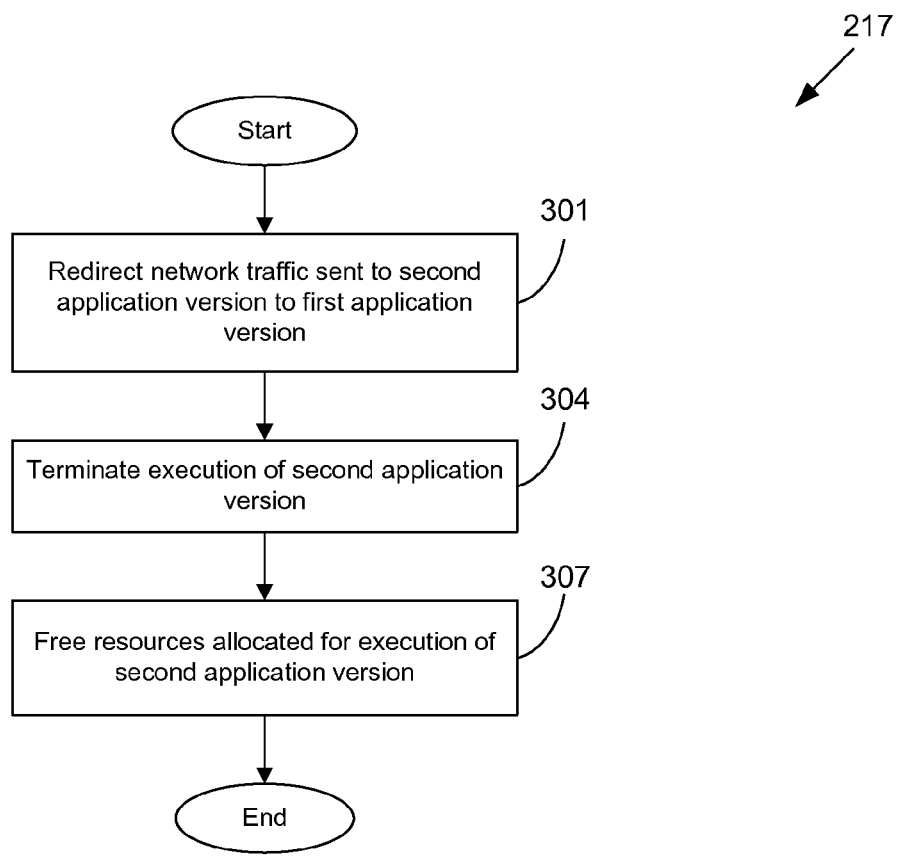
FIG. 3 is a flowchart illustrating one example of event triggered rollback functionality implemented as portions of the deployment management application of FIG. 2 according to various embodiments of the present disclosure.

Referring next to FIG. 3, shown is a flowchart that provides one example of the rollback functionality of the deployment management application 124 (FIG. 1) according to various embodiments. It is understood that the flowchart of FIG. 3 provides merely an example of the many different types of functional arrangements that may be employed to implement the operation of the portion of the deployment management application 124 as described herein. As an alternative, the flowchart of FIG. 3 may be viewed as depicting an example of steps of a method implemented in the computing environment 101 (FIG. 1) according to one or more embodiments.

Beginning with box 301, if the rollback functionality has been triggered, the deployment management application 124 redirects network traffic sent to the second version of the deployable application 127b (FIG. 1) to one or more concurrently executing instances of the first version of the deployable application 127a (FIG. 1). Redirecting network traffic may comprise modifying or reconfiguring a load balancer 121 (FIG. 1) in the computing environment 101, modifying a domain name system entry, or another approach.

In embodiments in which a rollback is triggered due to a failed verification of the second version of the deployable application 127*b* as shown in box 208 (FIG. 2), the deployment management application 124 may not have redirected network traffic to the second version of the deployable application 127*b* as shown in box 211 (FIG. 2). In such embodiments, no redirection to an instance of the first version of the deployable application 127*a* is required, and the operation proceeds to box 304.

Next, in box 304, the deployment management application 124 terminates the execution of the second version of the deployable application 127*b*. In one embodiment in which multiple instances of the second version of the deployable application 127*b* are executed on one or more application execution devices 114*b* (FIG. 1), this may comprise terminating a subset of the executing instances. In another embodiment in which multiple instances of the second version of the deployable application 127*b* are executed, this may comprise terminating the entirety of the executing instances. Other approaches may also be used to terminate the execution of the second version of the deployable application 127*b*.

After one or more instances of the second version of the deployable application 127*b* have been terminated, resources allocated for the execution of those instances are freed in box 307. The freeing of resources may be managed by the deployment management application 124, a service or process executed on the computing device 111 (FIG. 1), an application execution device 114, or another device or component, or by another approach. Freeing resources may comprise freeing allocated memory, modifying a file system associated with the disk space of an application execution device 114*b*, or terminating one or more services or processes. Freeing resources may also comprise freeing the entirety of resources associated with the application execution device 114*b* or another approach.

In some embodiments, freeing resources allocated for the execution of the second version of the deployable application 127*b* comprises freeing a portion of the allocated resources. In other embodiments, freeing resources allocated for the execution of the second version of the deployable application 127*b* comprises freeing the entirety of those allocated resources. Other approaches may also be used in freeing resources allocated for the execution of the second version of the deployable application 127*b*. Thereafter, the deployment management application 124 ends as shown.

Figure 4:
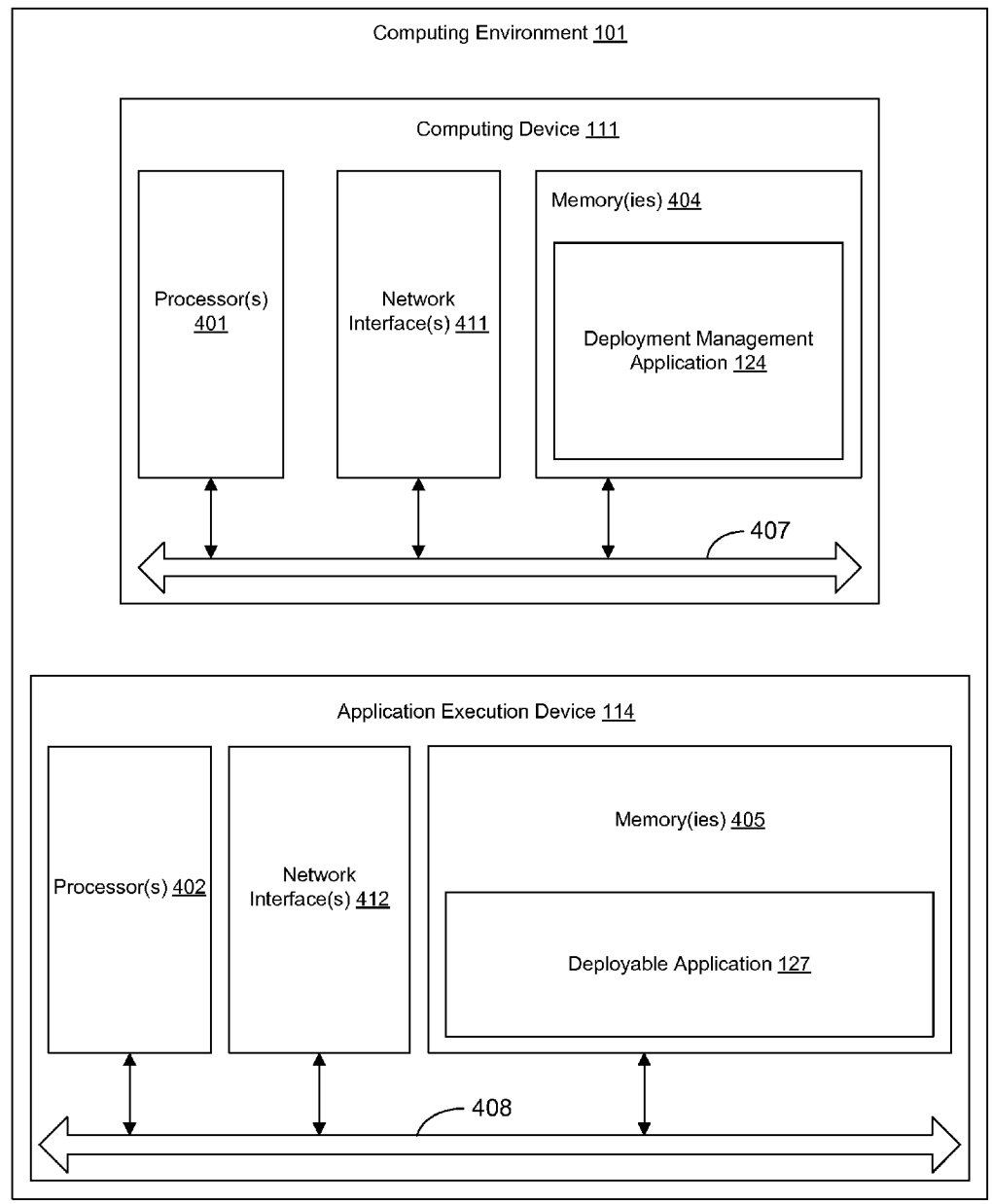
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 (FIG. 1) according to an embodiment of the present disclosure. The computing environment 101 includes one or more computing devices 111 (FIG. 1) and application execution devices 114*a* (FIG. 1) or 114*b* (FIG. 1), denoted here as application execution device 114. Each computing device 111 includes at least one processor circuit, for example, having a processor 401 and a memory 404, both of which are coupled to a local 407. To this end, each computing device 111 may comprise, for example, at least one server computer or like device. The local interface 407 may comprise, for example, a data bus with an accompanying address/control bus or other bus structure as can be appreciated.

Stored in the memory 404 are both data and several components that are executable by the processor 401. In particular, stored in the memory 404 and executable by the 401 are a deployment management application 124 (FIG. 1), and potentially other applications. In addition, an operating system may be stored in the memory 404 and executable by the processor 401.

Each application execution device 114 includes at least one processor circuit, for example, having a processor 402 and a memory 405, both of which are coupled to a local 408. To this end, each application execution device 114 may comprise, for example, at least one server computer or like device. The local interface 408 may comprise, for example, a data bus with an accompanying address/control bus or other bus structure as can be appreciated.

Network interfaces 411 and 412 facilitate communications between the computing device 111 or application execution device 114 and the network 107 (FIG. 1).

Stored in the memory 405 are both data and several components that are executable by the processor 402. In particular, stored in the memory 404 and executable by the 402 are a deployable application 127, and potentially other applications. In addition, an operating system may be stored in the memory 405 and executable by the processor 402.

It is understood that there may be other applications that are stored in the memory 404 or 405 are executable by the processor 401 or 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 or 405 and are executable by the processor 401 or 402. In this respect, the term "executable" means a program file that is in a form that can ultimately be run by the processor 401 or 402. Examples of executable programs may be, for example, a compiled program that can be translated into machine code in a format that can be loaded into a random access portion of the memory 404 or 405 and run by the processor 401 or 402, source code that may be expressed in proper format such as object code that is capable of being loaded into a random access portion of the memory 404 or 405 and executed by the processor 401 or 402, or source code that may be interpreted by another executable program to generate instructions in a random access portion of the memory 404 or 405 to be executed by the processor 401 or 402, etc. An executable program may be stored in any portion or component of the memory 404 or 405 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 or 405 is defined herein as including both volatile and nonvolatile memory and data storage components. Volatile components are those that do not retain data values upon loss of power. Nonvolatile components are those that retain data upon a loss of power. Thus, the memory 404 or 405 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 401 or 402 may represent multiple processors 401 or 402 and/or multiple processor cores and the memory 404 or 405 may represent multiple memories 404 or 405 that operate in parallel processing circuits, respectively. In such a case, the local interface 407 or 408 may be an appropriate network that facilitates communication between any two of the multiple processors 401 or 402, between any processor 401 or 402 and any of the memories 404 or 405, or between any two of the memories 404 or 405, etc. The local interface 407 or 408 may comprise additional systems designed to coordinate this communication, including, for example, performing load balancing. The processor 401 or 402 may be of electrical or of some other available construction.

Although the deployment management application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 401 or 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the deployment management application 124, that comprises software or code can be embodied in any non-transitory computer-readable medium for use by or in connection with an instruction execution system such as, for example, a processor 401 or 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   facilitate an execution of a first version of an application associated with a first amount of computational resources;
   obtain a second version of the application from a client device over a network;
   allocate a second amount of computational resources associated with an execution of the second version of the application;
   facilitate the execution of the second version of the application concurrent to the execution of the first version of the application;
   reconfigure a load balancer to redirect a portion of network traffic directed to the first version of the application to the second version of the application;
   reconfigure, in response to a number of errors in the execution of the second version of the application exceeding a predefined error count threshold, the load balancer to direct the portion of network traffic to the first version of the application;
   terminate, in response to the number of errors exceeding the predefined error count threshold, the execution of the second version of the application; and
   free, in response to the number of errors exceeding the predefined error count threshold, the second amount of computational resources after terminating the execution of the second version of the application.

2. The non-transitory computer-readable medium of claim 1, wherein the program further causes the at least one computing device to reconfigure, in response to an input from the client device, reconfigures the load balancer to direct the portion of network traffic to the first version of the application.

3. The non-transitory computer-readable medium of claim 1, wherein the program further causes the at least one computing device to calculate a fee associated with the second version of the application based at least in part on with the second amount of computational resources and the execution of the second version of the application.

4. A system comprising at least one computing device configured to at least:
- allocate, contemporaneous to an execution of a first version of an application, resources of the system for an execution of a second version of the application;
- initiate, contemporaneous to the execution of the first version of the application, the execution of the second version of the application;
- reconfigure, contemporaneous to the execution of the first version of the application and the second version of the application, the system to direct communications sent to the first version of the application to the second version of the application; and
- reconfigure, in response to an number of errors associated with the execution of the second version of the application exceeding a predefined error count threshold, the system to direct communications sent to the second version of the application to the first version of the application.

5. The system of claim 4, the at least one computing device further configured to at least free an allocation of resources of the system associated with the execution of the first version of the application after terminating the execution of the first version of the application.

6. The system of claim 4 further comprising a load balancer, and wherein reconfiguring the system to direct communications sent to the first version of the application to the second version of the application further reconfiguring the load balancer to instantaneously redirect the communications.

7. The system of claim 4, wherein reconfiguring the system to direct communications sent to the first version of the application to the second version of the application further comprises modifying a domain name system entry associated with the at least one computing device.

8. The system of claim 4, wherein the at least one computing device is further configured to at least terminate the execution of the first version of the application in response to an input from a client device over a network.

9. The system of claim 4, wherein the at least one computing device is further configured to at least terminate the execution of the first version of the application in response to a satisfaction of a predefined condition.

10. The system of claim 9, wherein the predefined condition comprises a duration associated with the execution of the second version of the application exceeding a threshold.

11. The system of claim 4, wherein the at least one computing device is further configured to at least calculate a fee associated with the execution of the second version of the application.

12. The system of claim 4, wherein the at least one computing device is further configured to at least obtain the second version of the application in response to a commitment to a version control system.

13. The system of claim 4, wherein the at least one computing device is further configured to at least communicate a notification to a client device indicating a status of a deployment process associated with the second version of the application.

14. The system of claim 4, wherein reconfiguring the system to direct communications sent to the first version of the application to the second version of the application comprises incrementally increasing an amount of the communications sent to the first version of the application being directed to the second version of the application.

15. A method comprising:
- allocating, by at least one computing device, contemporaneous to an execution of a first version of an application, resources of the system for an execution of a second version of the application;
- initiating, by the at least one computing device, contemporaneous to the execution of the first version of the application, the execution of the second version of the application;
- reconfiguring, by the at least one computing device, contemporaneous to the execution of the first version of the application and the second version of the application, the system to direct communications sent to the first version of the application to the second version of the application; and
- reconfiguring, by the at least one computing device, in response to an number of errors associated with the execution of the second version of the application exceeding a predefined error count threshold, the system to direct communications sent to the second version of the application to the first version of the application.

16. The method of claim 15, further comprising freeing an allocation of resources of the system associated with the execution of the first version of the application after terminating the execution of the first version of the application.

17. The method of claim 15, wherein reconfiguring the system to direct communications sent to the first version of the application to the second version of the application further reconfiguring a load balancer to instantaneously redirect the communications.

18. The method of claim 15, wherein reconfiguring the system to direct communications sent to the first version of the application to the second version of the application further comprises modifying a domain name system entry associated with the at least one computing device.

19. The method of claim 15, further comprising terminating the execution of the first version of the application in response to an input from a client device over a network.

20. The method of claim 15, further comprising terminating the execution of the first version of the application in response to a satisfaction of a predefined condition.

* * * * *